United States Patent [19]

Carlson

[11] Patent Number: 4,895,221
[45] Date of Patent: Jan. 23, 1990

[54] METHOD AND APPARATUS FOR INSTALLING A FISH TAPE IN A CONDUIT

[76] Inventor: Brian E. Carlson, Rte. 3 Box 32 C Entler Ave., Chico, Calif. 95928

[21] Appl. No.: 221,881

[22] Filed: Jul. 20, 1988

[51] Int. Cl.$^4$ .......................... H02G 1/08; F16N 7/16; F16N 7/24; F16L 55/00
[52] U.S. Cl. ...................... 184/15.1; 254/134.3 FT; 15/104.16; 184/109; 184/18; 184/19; 184/102
[58] Field of Search .................... 184/15.1, 18, 19, 20, 184/98, 102, 109; 15/104.16, 104.165; 254/134.3 FT

[56] References Cited

U.S. PATENT DOCUMENTS

| | | | |
|---|---|---|---|
| 1,858,997 | 5/1932 | Lewin | 254/134.3 FT |
| 2,637,058 | 5/1953 | Anderson | 15/104.16 |
| 2,642,602 | 6/1953 | Kelly | 15/104.16 |
| 2,897,525 | 8/1959 | Goodwin et al. | 15/104.165 |
| 3,035,817 | 5/1962 | Wilson | 254/134.3 |
| 3,041,043 | 6/1962 | Harden | 254/134.3 |
| 3,110,478 | 8/1960 | Bostick | 254/134.3 FT |
| 3,330,533 | 7/1967 | Blume | 254/134.3 |
| 3,438,461 | 4/1969 | MacPherson | 184/109 |
| 4,108,279 | 8/1978 | Marcell | 15/104.16 |
| 4,137,623 | 2/1979 | Taylor | 184/15 R |
| 4,275,096 | 6/1981 | Taylor | 184/18 |
| 4,411,409 | 10/1983 | Smith | 254/134.3 FT |
| 4,475,629 | 10/1984 | Jonnes | 184/15.1 |
| 4,569,420 | 2/1986 | Pickett et al. | 254/134.3 FT |

Primary Examiner—Henry A. Bennet
Assistant Examiner—Denise L. Ferensic

[57] ABSTRACT

A new method and apparatus for quickening in the insertion of a fish tape through a conduit by reducing the occurrence of frictional adhering. The apparatus provided in several embodiments uses flexible lubricant carrying materials having pressure sensitive fluid release characteristics affixed to the free end of a fish tape. The apparatus is saturated with a fluid lubricant prior to being inserted into an opening of the conduit and pushed. As the pressure sensitive material enters a bend in the conduit, pressure is applied to the pressure sensitive material by the long radius wall surface of the bend causing lubricant to be released. The possibility of frictional adhering of anything being pushed through the bend is greatly reduced. The apparatus moves past the well lubricated area and is immediately followed by the body of the fish tape. In the event frictional adhering does occur between the fish tape with attached lubricant spreading apparatus and the conduit, permanent hookable loops are provided to allow easy hooking and pulling of the apparatus by a second fish tape.

11 Claims, 3 Drawing Sheets

METHOD AND APPARATUS FOR INSTALLING A FISH TAPE IN A CONDUIT

BACKGROUND OF THE INVENTION

1. Field of the Invention:

This invention relates to conduit rodding or fishing methods and devices used in the electrical construction and related industries. More specifically it relates to fish tape attachments having conduit lubricating means and flexible loops for freeing frictionally restrained fish tapes.

2. Description of the Prior Art:

In the electrical construction industry as well as others such as cable TV and telephone, it is necessary to insert conductors into protective conduits. These conduits are often made inaccessible by walls, ceilings, and floors of a building, or earth in underground construction prior to the installation of the conductors. In order to install the conductors, a long semi-flexible rod or ribbon made of steel or plastic, called a fish tape is commonly used. The fish tape is manually pushed through the conduit and attached to the conductors. The conductors are then attached and pulled back through the conduit with the fish tape. Several problems become evident with the use of this procedure and the fish tape. One problem is the stoppage of the fish tape while being pushed through the conduit due to frictional drag of the fish tape against the interior walls of the conduit. A short, very flexible fish tape spring-leader attachment has in the past been attached to the free end of the fish tape to assist in starting the tape around bends while being pushed through the conduit. Often, both the fish tape and spring-leader will become stuck while being pushed. Some fish tapes and leaders have been manufactured having loop structures designed to be hooked by a second fish tape. The second fish tape, with a hook structure on the free end is pushed from the opposite opening of the conduit by a second worker. This second fish tape is used to hook the loop structure of the stuck tape or leader and pull it the remainder of the way through the conduit.

The frictional forces responsible for sticking the fish tape are present between conductors sliding against interior conduit walls when being installed. Lubrication has in the past, been applied to the conductors prior to entering the conduit to reduce friction and consequently the pounds of pull needed to move the conductors through the conduit. Too much fiction results in a great deal of pulling pressure needed to move the conductors. This high pulling pressure can result in damaging the insulation on the conductor; the conductor, or both. The problem with applying lubricant to the conductors as they are entering the conduit is that the lubricant is usually wiped off onto the sides of the conduit before the conductors reach the bends, the location where lubrication is most needed. Also, conductors are often pulled manually making it desirable to reduce the amount of work needed to install the conductors. These procedures and apparatuses although somewhat effective, still have room for improvement.

Two separate searches were conducted to produce past art patents concerning conduit lubricating devices and methods, and fish tape leaders having hookable loops.

The first search was conducted in the following classes and subclasses for conduit lubricating devices and methods:
254/134.3FT, 134.3R, 134.7, 184/15,1 16, and 19.

The following patents represented devices which seemed most pertinent to my invention:
1. Pat. No. 4,137,623, was issued to Taylor on Feb. 6, 1979, for "Method and Apparatus for Dispensing Fluid in a Conduit".
2. Taylor was also issued Pat. No. 4,275,096, on Jun. 23, 1981, for a similar device.
3. On Oct. 9, 1984, Jonnes was issued Pat. No. 4,475,629, for "Method and Apparatus For Selectively Metering And Spreading Lubricant In A Conduit".
4. Pickett et al, was issued Pat. No. 4,569,420, on Feb. 11, 1986, for "Lubricating Method And System For Use In Cable Pulling".

The aforementioned devices are primarily concerned with lubricating the conduit prior to the passage of the electrical conductors after a fish tape or pull line has been installed through the conduit. No devices are provided for application of lubricant for the specific purpose of easing the initial installation of the fish tape or would they be suitable for such use. The above past art devices are uni-directional for lubricating the inner conduit walls, being effective only when pulled through a conduit since they are not structured in a manner that would allow them to be pushed. These devices are only useful after a pull line of some sort has been installed through the conduit.

The following past art patents represent devices concerned with fish tapes and fish tape attachments having loop structures and were found in the subsequent classes and subclasses; 254/134.3.
1. Wilson was issued Pat. No. 3,035,817, on May 22, 1962, for "Fish Tape Snagger".
2. Pat. No. 3,041,043, was issued to Harden, on June 26, 1962, for "Line Pull-Through Device".
3. On July 11, 1967, Blume was granted Pat. No. 3,330,533, for "Twisted Hook Terminal For Rodding Ducts".

The above three patents teach conduit fishing or rodding devices with hookable structures. The hookable loop portion of the Wilson device is attached to the conductor attachment eye and must be removed before the conductors can be attached for pulling. If the loop structure were to be left on the eye of the fish tape or leader there would be less room to attach the conductors. Also the added bulk of the looped assemblage over the wires would pose a binding problem within the narrow limited space of the conduit. The Harden and Blume apparatuses would also need to be removed before pulling conductors through the conduit. These hookable loop structured devices are not suitable to be used as the wire pulling device. The worker apparently would have to anticipate getting stuck to use such a device. Most often he would try to push a standard fish tape through the conduit. If the fish tape got stuck, he would have to pull it out of the conduit, attach one of the aforementioned loop structured devices to it and push it back into the conduit. In any case, there is usually a second worker standing at the opposite end of the conduit waiting for the fish tape to exit so he can attach the conductors to be pulled through the conduit. Any delay in the installation of the fish tape causes a loss of time and a consequent loss of money in the form of wages.

I feel my invention not only overcomes the disadvantages presented in the previously mentioned past art patents but provides new and useful benefits not possessed by any related device.

SUMMARY OF THE INVENTION

In practice, I have developed attachments for use with fish tapes to reduce the problem of frictional adhering of the tape while being initially pushed through the conduit. My attachments also reduce friction between moving electrical conductors and the conduit walls. With my invention, installation time is saved by eliminating the necessity of continually attaching and removing the added accessories noted in some of the past art devices. The worker doesn't need to try to predict when he should take the time to attach a loop structure to his fish tape. My devices, attachable to the free end of any fish tape are bi-directional in that they can be effectively utilized by pushing or pulling through a conduit. The invention uses a pressure sensitive fluid absorbent outer jacketing for applying lubricant to conduit wall surfaces to reduce friction in the initial installation of the fish tape, while at the same time pre-lubricating the conduit walls for the conductor pulling process. The lubricant is applied on the exact area where the fish tape or the conductors slide against the interior conduit wall surfaces. The invention also provides flexible loops which can be easily hooked and pulled by a second fish tape in the event the invention becomes stuck in the conduit. The loops are placed so that they do not overlap or interfere with the conductor attachment eye on the fish tape, and yet the loops can be easily hooked by a second fish tape. The loops are left on during both the pushing and pulling processes without the problem of adding bulk to the conductors being pulled.

The pressure sensitive apparatus is provided in several embodiments. One embodiment is comprised of a section of absorbent, flexible sponge-like material affixed to a portion of a flexible rod between a conductor attachment eye and an end of my device structured for removable attachment to a fish tape. The sponge-like material is structured to absorb, releasably retain and then meter any approved fluid such as wire pulling lubricant onto particular sections of interior conduit wall surfaces. Permanently bound to the flexible rod in the sponge-like jacketing section are flexible loops. The loops are positioned to allow them to fold only partly into the area of the conductor attachment eye and slightly past the end of the sponge-like material adjacent the conductor attachment eye.

A second embodiment of my invention provides a fish tape attachment with an absorbent looped-fabric, jacketing a section of a spring rod. The absorbent material is similar to looped shag carpet floor covering. The jacketing material will absorb and meter the lubricant, and the loops intrinsic to the structure of the material provide the hookable loops of a suitable length.

Both embodiments are manufactured complete as leaders with spring rods attachable to the free end of a fish tape, however the fluid absorbent materials and loops are also provided as accessory attachment embodiments designed for in the field attachment to existing conventional fish tapes and spring leaders which the tradesman may already own. My accessory attachment embodiments have an inner core of heat shrinkable tubing to which the sponge-like material or looped carpet-like material is adhered. These embodiments are designed to be slipped over a typical spring leader or fish tape, positioned correctly and then gently heated with hot water or air to reduce the internal diameter of the shrink tubing tightly onto the fish tape.

Therefore, a primary object of my invention is to provide a fish tape attachment with means for lubricating a conduit for easier initial insertion of the fish tape, and a means for hooking and pulling a fish tape by a second fish tape should it become bound within the conduit.

A further object of my invention is to provide a fish tape attachment with hookable loops which do not connect to, or completely overlap the conductor attachment eye of the fish tape to allow the loops to be left on for both pushing and pulling modes.

Another object of my invention is to provide a fish tape attachment which acts as a swab to pickup pieces of debris which may be in the conduit.

A still further object of my invention is to provide an attachment means for my lubricating and flexible loop apparatuses for attachment to existing fish tapes and spring leaders.

Other objects and advantages of my invention will be disclosed by reading the following specification and subsequent comparison with the numbered parts shown in the accompanying drawings.

Figure 1:
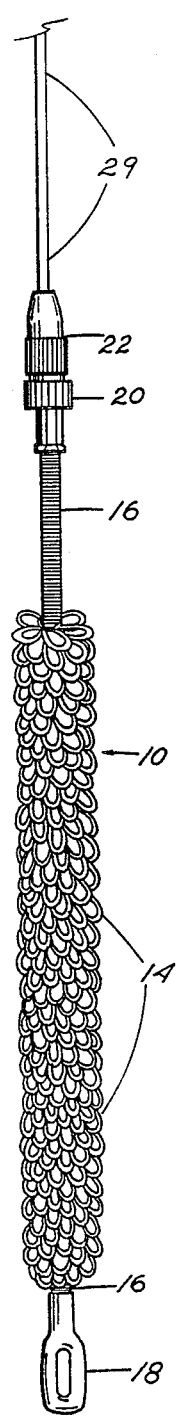
FIG. 1 illustrates the complete looped carpet-like fabric material embodiment of the invention attached to a fish tape. The carpet-like material is shown partially covering the center flexible rod of the invention.

DRAWING REFERENCE NUMBERS 10 complete looped fabric jacketed embodiment
12 complete sponge-like jacketed embodiment
14 inherent loops
16 flexible rod
18 conductor attachment eye
20 fish tape attachment terminal
22 attachment nut
24 absorbent jacket 26 heat shrinkable tubing
28 fish tape
29 free end of fish tape
30 conduit
31 long radius wall surface of bend
34 accessory attachment embodiment
36 fabric backing
38 loop assembly
40 central attachment loop
42 lubricant
44 movement directional arrows

DESCRIPTION OF THE PREFERRED EMBODIMENTS

Figure 2:
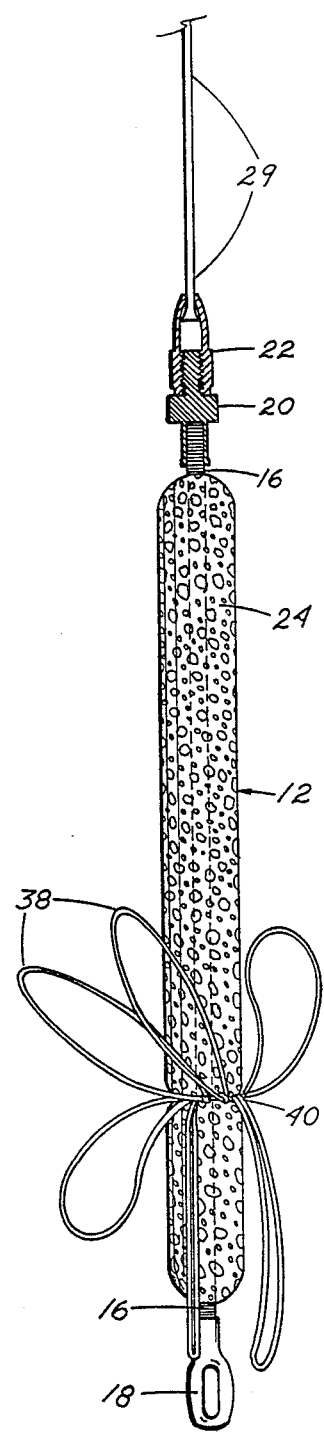
FIG. 2 illustrates the complete sponge-like material embodiment with connected loops attached to a fish tape. The sponge-like material is shown covering the entire length of the center flexible rod.
Figure 6:
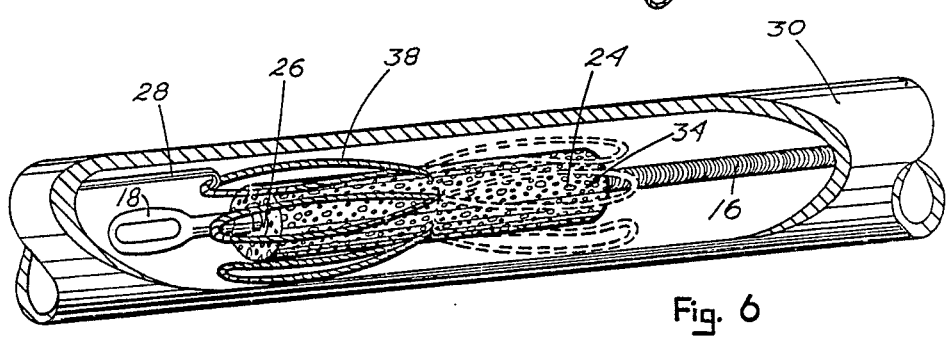
FIG. 6 illustrates the sponge-like accessory embodiment attached to a standard spring leader in use within a conduit. Also shown is the end of a second fish tape with an open bent hook in the process of hooking the forward folded loops after the invention has become stuck and has pulled backward in the conduit a foot or so. Depicted by dotted lines is the position of the flexible loops as they would appear in the forward pushing mode.

Referring now to the drawings in general and FIG. 1 in particular where complete looped fabric jacketed embodiment 10 is shown attached to the free end of fish tape 29 by a strong metal or plastic fish tape attachment terminal 20 and metal attachment nut 22. This attachment method is shown in a cut-away view in FIG. 2 depicting fish tape attachment terminal 20 securely crimped with compression over the outside of flexible rod 16 at one end, and having a male threaded stud positioned oppositely. Attachment nut 22 has female threads in one opened end for cooperative threading with the threads of attachment terminal 20. Attachment nut 22 also has an unthreaded hollow inner section behind the threaded section which tapers to an aperture in the back of the nut 22. This aperture is sized for the insertion of the free end of fish tape 29. Attachment nut 22, prior to threading onto fish tape attachment terminal 20 is slipped over the end of fish tape 29, the free end of fish tape 29 is brought completely through nut 22 where it is hammered flat and wide before being pulled back into attachment nut 22 where it is restricted from pulling completely through the small aperture due to the newly widened end. Attachment nut 22 is then threaded onto fish tape attachment terminal 20 and tightened. This is just one example of a known method of attaching a leader to a fish tape 28 and other methods for round or plastic fish tapes are well known to those skilled in the art. Securely affixed to fish tape attachment terminal 20 is flexible rod 16, a resilient flexible cylindrically shaped elongated rod manufactured of any high strength yet flexible material such as plastic or metal. Flexible rod 16 as shown in the drawings is structured of a metal wound wire cable. Securely affixed at the opposite end of flexible rod 16 is conductor attachment eye 18 structured of any suitably strong material such as plastic or metal. As shown, conductor attachment eye 18 is manufactured of metal and is affixed by compression crimping, but could be affixed by welding or other suitable means. The plastic embodiment of conductor attachment eye 18 would be attached to flexible rod 16 with heat shrinking, adhesives, compression, sonic bonding, or combinations thereof. Conductor attachment eye 18 as shown in FIGS. 1, 2, and 6 has a smooth somewhat rounded terminal end which divides into two substantially parallel bars extending towards flexible rod 16 before joining together to form a hollow tube for which flexible rod 16 is slipped into and secured. Between the two parallel bars is the aperture which conductors are intended to be attached through.

Figure 3:
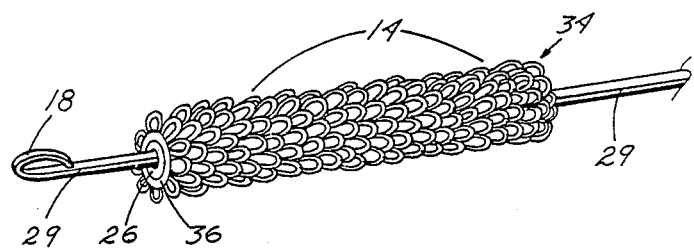
FIG. 3 illustrates my looped carpet-like accessory attachment embodiment in a perspective view attached directly to the free end of a fish tape.

The embodiment shown in FIG. 1 and the accessory attachment embodiment 34 shown in FIG. 3 use an outer material having a strong flexible fabric backing 36 such as heavy cloth or leather with a plurality of inherent loops 14 made of fabric or leather securely attached forming a looped carpet-like jacketing for attachment to the outer longitudinal surface of flexible rod 16 or the free end of a fish tape 29. Attachment of this carpet-like jacketing is accomplished by adhesives or other suitable means to flexible rod 16 starting adjacent conductor attachment eye 18 and extending toward the fish tape attachment terminal 20. The carpet-like jacketing is shown covering the outer surface of flexible rod 16 only partially in FIG. 1, but can cover all of the rod 16 as does the absorbent jacket 24 of a second embodiment shown in FIG. 2. The longer the jacketing material, the more of lubricant 42 will be able to be releasibly retained. The complete sponge-like jacketed embodiment 12 of FIG. 2 has absorbent jacket 24 securely attached to the outer surface of flexible rod 16. As shown in FIG. 2, 4, 5, 6, absorbent jacket 24 is manufactured of a flexible open cell plastic foam, but could be manufactured of any other suitably similar material such as sponge, rough surfaced suede leather, or a heavy fabric. Attachment of absorbent jacket 24 to flexible rod 16 is made by adhesives, vulcanizing, or other suitable means. Placement of absorbent jacket 24 begins adjacent conductor attachment eye 18 and extends toward fish tape attachment terminal 20. Both absorbent jacket 24 of complete sponge-like jacketed embodiment 12 and the carpet-like material of complete looped fabric jacketed embodiment 10 are designed to absorb large quantities of lubricant 42 such as wire pulling compound or other lubricants 42 deemed suitable for use in conduits and on the insulation of conductors. The absorbed lubricant 42 is releasibly held within the jacketing material until pressure is applied to the pressure sensitive material causing the release of a quantity of lubricant 42 onto the surface which is exerting the pressure. With the carpet-like material the fabric inherent loops 14 releasibly retain the lubricant 42 along with the fabric backing 36.

Figure 4:
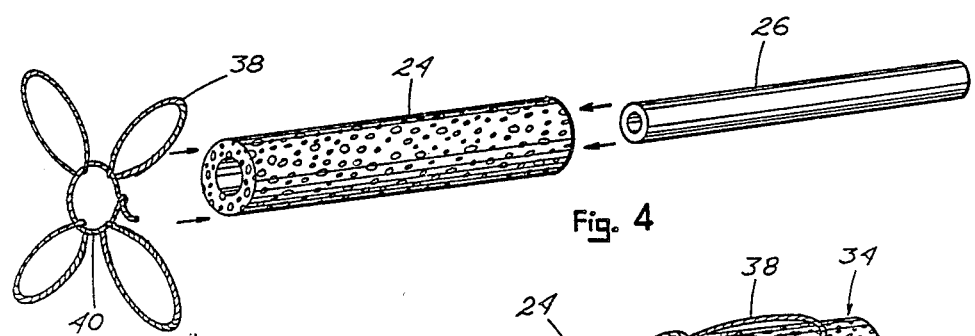
FIG. 4 is a perspective exploded view of the component parts of the accessory sponge-like embodiment.
Figure 5:
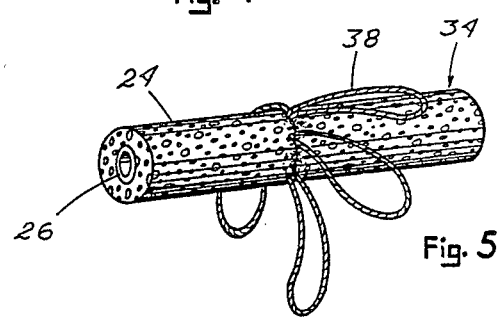
FIG. 5 is an assembled view of the accessory embodiment shown in FIG. 4.
Figure 7:
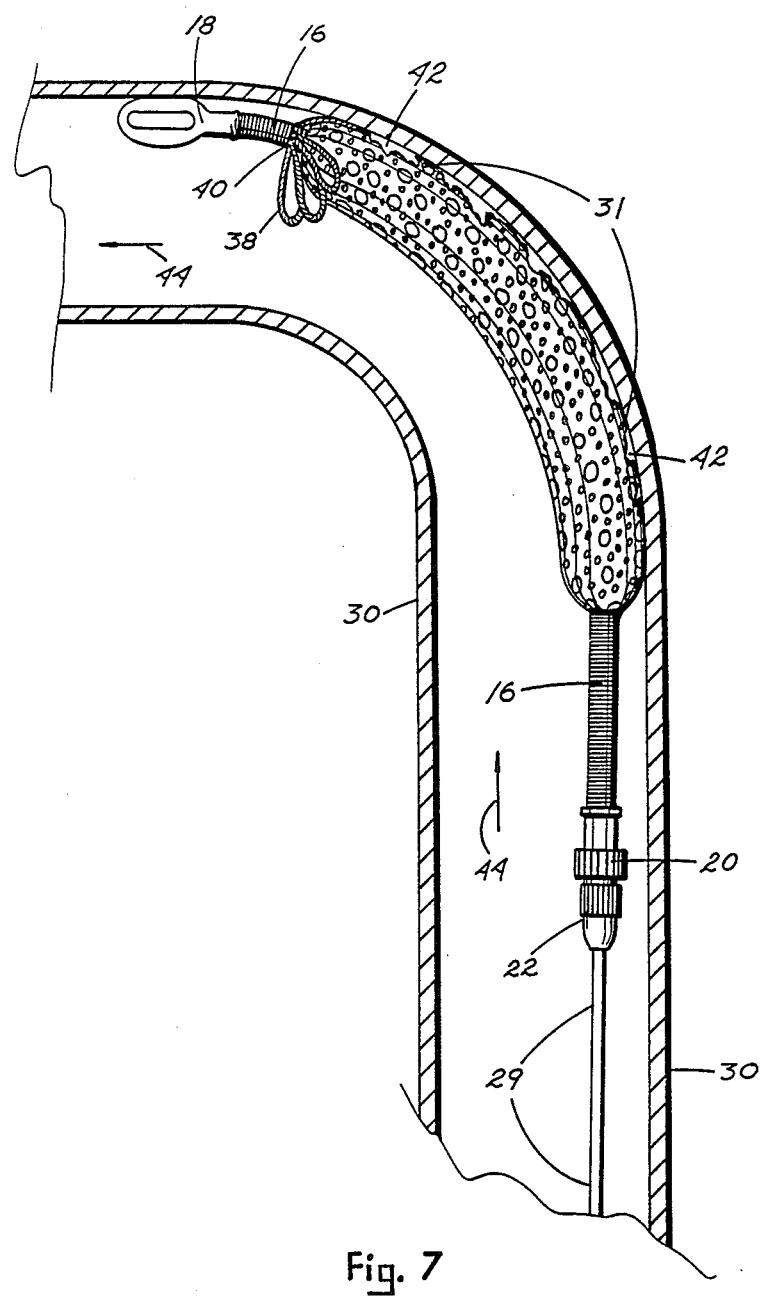
FIG. 7 illustrates the complete sponge material embodiment with flexible rod attached to a fish tape. The invention is shown being forced against the interior longer radius wall surface of a bend in a conduit. Lubricant is shown being released out of the pressure sensitive material and spread onto the conduit wall.

Securely affixed in the sponge-like jacketed area of embodiment 12 is an addendum loop assembly 38 consisting of a plurality of loops formed around a central attachment loop 40 shown best in FIG. 4. Loop assembly 38 can also be attached slightly beyond the end of the lubricant carrying material, behind the conductor attachment eye 18 as shown in FIG. 7. The placement and lengths of the plurality of loops relative to conductor attachment eye 18 is critical for proper utilization. The maximum forward folded distance of the loops is the beginning of the hole in conductor attachment eye 18, and a minimum forward folded distance being slightly past the forward end of absorbent jacket 24 or fabric backing 36. The minimum and maximum forward distances of the loops allow hooked fish tape 32 to move past the small conductor attachment eye 18 to hook inherent loops 14 or the loops of loop assembly 38 without having to move past the larger absorbent material area, which in the smaller conduits 30 is sometimes constricted as shown in FIG. 6. Loop assembly 38 is manufactured of a flexible non-resilient material having a tensile strength of at least 10 pounds. This low strength requirement is due to the fact that the loops are not designed to be used to pull the conductors which sometimes require hundreds of pounds of pulling pressure. Loop assembly 38 need only be strong enough to be hooked by a second hooked fish tape as shown in FIG. 6, and pulled the remainder of the distance through the conduit 30. This low strength requirement allows for the use of absorbent materials such as twine, string, or other fabric material such as used in complete looped fabric jacketed embodiment 10 for the manufacture of loop assembly 38. For a more durable loop assembly 38, non-absorbent materials such as flexible plastic, or somewhat absorbent leather, small flexible metal cable or chain is used. Loop assembly 38 manufactured of metal chain is very flexible, durable, and is easily attached by welding central attachment loop 40 to metal flexible rod 16 or by inserting central attachment loop 40 between flexible rod 16 and the tubular attachment end of conductor attachment eye 18 prior to compression crimping. It is conceivable that loop assembly 38 if manufactured of suitably strong materials could under some conditions also be used to pull wire. In FIG. 2 loop assembly 38, made of plastic, is shown attached through a two piece absorbent jacket 24 where attachment loop 40, sized just slightly larger in internal diameter than the external diameter of flexible 16, has been slipped over flexible rod 16 prior to affixing conductor attachment eye 18, and adhered with glue, sonic bonding or other suitable means. Absorbent jacket 24 has been installed on each side of loop assembly 38 and aids in retaining loop assembly 38 by creating a wall which central attachment loop 40 would have to expand over to be pulled off. As shown in FIG. 4, 5, 6, loop assembly 38 is made of a twine or string material with central attachment loop 40 having been tightly tied around absorbent jacket 24.

Both complete looped fabric jacketed embodiment 10 and complete sponge-like jacketed embodiment 12 are manufactured complete as attachable spring-type leaders for fish tapes, however the fluid absorbent materials and loops are also provided as accessory attachment embodiments 34 designed for in the field attachment to existing conventional spring leaders and the fish tapes 28 tradesman may already own. The accessory attachment embodiments 34 have an inner core of heat shrinkable tubing 26 to which the sponge-like absorbent jacket 24 or the fabric backing 36 with inherent loops 14 is adhered with glue, stitching or other suitable means. The heat shrinkable tubing 26 has an expanded internal diameter greater than the largest diametrical portion of the free end of fish tape 29, and a recovered internal diameter less than the smallest diametrical portion of the free end of fish tape 29 or flexible rod 16. These embodiments as shown in FIG. 3, and 4, are structured to be slipped over conductor attachment eye 18 of a spring leader or the terminal conductor attachment eye of a fish tape when the fish tape is intended to be used without a spring leader. The accessory attachment embodiment 34 is then positioned correctly and gently heated with hot water or air to reduce the diameter the heat shrinkable tubing 26 thus securing the unit onto the spring leader or fish tape. Accessory attachment embodiment 34 is then used in the same manner as complete looped fabric jacketed embodiment 10 and complete sponge-like jacketed embodiment 12. The heat shrinkable tubing 26, along with the adhered outer jacket is easily cut and removed with a knife to allow the absorbent material to be replace in the event of excessive wear.

In use, one of my embodiments 10, 12, or 34 is attached to the free end of a fish tape 29 and coated with a lubricant 42 making sure to saturate the absorbent jacket 24 material. The free end of the fish tape 29 is then inserted into an opening in conduit 30 and pushed. In the straight lengths of the conduit 30, the invention, attached at the free end of the fish tape 29 glides on the interior downward surface of the conduit 30 wall releasing only a small amount of the lubricant 42 in the path of the adjacent fish tape 28. Most of the lubricant 42 is retained in the pressure sensitive absorbent jacket material 24 until it reaches the long radius wall surface of a bend 31. As the lubricating embodiment enters the bend it is forced against the longer radius wall surface in the bend 31. The force creates pressure on the absorbent material causing it to release the lubricant 42 onto the area of highest frictional drag to the leader attachment and adjacent fish tape 28 in the bend. Both the leader and fish tape 28 are more able to move past this area and continue on through the conduit 30. As the lubricating leader moves through the conduit 30, it picks up small pieces of metal filings and other debris which might be in the conduit 30 and could damage the insulation on the conductors. If the leader becomes stuck in the conduit 30, the operator pulls back on the fish tape 28 a foot or so, the inherent loops 14 or the loops of add-on loop assembly 38 fold forward toward the conductor attachment eye 18 where the loops are easily hooked by a second fish tape and pulled the remainder of the distance through the conduit 30 as shown in FIG. 6. When the fish tape exits the conduit 30 the absorbent jacketing 24 is wiped off to remove the debris. Conductors are then attached through the conductor attachment eye 18 and the absorbent jacketing 24 is then recoated with lubricant 42. The fish tape 28 with my attached invention and conductors are then pulled back through the conduit 30. As the lubricated attachment enters a bend while being pulled, it is forced against the short radius wall surface of the bend releasing the lubricant 42 onto the area of very high resistance to movement of the conductors, the lubricant 42 allows the conductors to move easily through the bend.

Although I have described my invention in detail in the specification it is to be understood that modifications and changes may be practiced in the structure and method of use of my invention which do not exceed the intended scope of the appended claims.

What I claim as my invention is:

1. An apparatus for aiding the insertion of a fish tape through a conduit, comprising:
    a length of flexible plastic heat shrinkable tubing having an expanded internal diameter greater than the largest diametrical portion of a free end of said fish tape, and a recovered internal diameter less than the smallest diametrical portion of said free end of said fish tape;
    means for releasably retaining a fluid lubricant affixed to a longitudinal surface of said heat shrinkable tubing;
    a plurality of flexible loops f sufficient length to reach beyond said length of said heat shrinkable tubing.

2. The apparatus of claim 1 wherein said means for releasably retaining fluid lubricant is a jacketing affixed to said heat shrinkable tubing manufactured of materials having fluid absorption and pressure sensitive fluid release characteristics, including flexible open cell plastic foam, sponge, heavy fabric, and other suitable materials.

3. The apparatus of claim 1 wherein said plurality of flexible loops are manufactured of suitably strong materials including metal cable, metal chain, plastic, fabric, woven fibers, leather, and combinations thereof.

4. The apparatus of claim 1 wherein said plurality of flexible loops are intrinsic with said lubricant retaining means.

5. The apparatus of claim 1 wherein said plurality of flexible loops are an addendum to said lubricant retaining means.

6. A method of lubricating a portion of an interior wall surface of at least one bend in a conduit immediately adjacent a free end of an advancing fish tape, comprising the steps of:
   (a) fixedly adhering a pressure sensitive lubricant dispensing device at said free end of said fish tape;
   (b) saturating said lubricant dispensing device with a fluid lubricant;
   (c) inserting said free end of said fish tape into an opening in said conduit;
   (d) pushing said fish tape forward in said conduit through said bend wherein said lubricant dispensing device is forced against a longer radius wall surface of said bend releasing said fluid lubricant prior to passage of said fish tape thereby reducing friction between said fish tape with said attached lubricant dispensing device and said longer radius wall surface of said bend.

7. An apparatus for aiding the insertion of a fish tape while being pushed through a conduit, comprising:
   a generally cylindrically shaped elongated flexible rod;
   means for removably attaching one end of said flexible rod to a free end of said fish tape;
   means for removably attaching conductors to an end of said flexible rod oppositely disposed of said fish tape attachment means;
   means for absorbing and releasably retaining a fluid lubricant affixed to an outer surface of said flexible rod;
   means for pushing said apparatus through said conduit to release a retained said fluid lubricant when forced against a longer radius interior wall surface of a bend in said conduit releasing said fluid lubricant prior to passage of said fish tape thereby reducing friction between said fish tape with said attached lubricant dispensing device and said longer radius interior wall surface of said bend.

8. The apparatus of claim 7 wherein said flexible rod is manufactured of suitably strong materials including metals, plastics, and combinations thereof.

9. The apparatus of claim 7 wherein said means for absorbing and releasably retaining a fluid lubricant is a jacketing manufactured of materials having fluid absorption and pressure cell plastic foam, sponge, heavy fabric, leather, and combinations thereof.

10. The apparatus of claim 9 wherein said jacketing covers said flexible rod substantially from adjacent said conductor attachment means to said fish tape attachment means.

11. The apparatus of claim 9 wherein said jacketing is affixed to said flexible rod by gluing.

* * * * *